(12) United States Patent
Gerber

(10) Patent No.: US 8,051,767 B2
(45) Date of Patent: Nov. 8, 2011

(54) CONIC FUNNEL INTEGRALLY CONNECTED TO A SUPPORTING PLANAR PLATFORM

(76) Inventor: Jack Gerber, Elizabeth, NJ (US)

( * ) Notice: Subject to any disclaimer, the term of this patent is extended or adjusted under 35 U.S.C. 154(b) by 562 days.

(21) Appl. No.: 12/287,876

(22) Filed: Oct. 15, 2008

(65) Prior Publication Data

US 2010/0089245 A1 Apr. 15, 2010

(51) Int. Cl.
*A47J 31/02* (2006.01)
(52) U.S. Cl. ............. 99/306; 99/323; 210/474; 426/77
(58) Field of Classification Search .............. 99/279, 99/300, 304, 306, 316, 317, 321, 323; 210/474; 426/77, 79, 82
See application file for complete search history.

(56) References Cited

U.S. PATENT DOCUMENTS

| 90,159 | A | * | 5/1869 | Erskine | 99/316 |
|---|---|---|---|---|---|
| 365,560 | A | * | 6/1887 | Adwen | 210/474 |
| 394,046 | A | * | 12/1888 | Wilson | 99/316 |
| 956,332 | A | * | 4/1910 | Fuller | 210/474 |
| 1,507,522 | A | * | 9/1924 | Simon | 210/474 |
| 1,687,345 | A | * | 10/1928 | Meyer | 99/316 |
| 1,734,841 | A | * | 11/1929 | Walden | 210/474 |
| 2,234,397 | A | * | 3/1941 | Bentz | 99/306 |
| 2,693,883 | A | * | 11/1954 | Schlumbohm | 99/316 |
| 2,835,191 | A | * | 5/1958 | Clurman | 210/474 |
| 2,897,970 | A | * | 8/1959 | Schlumbohm | 210/474 |
| 3,063,359 | A | * | 11/1962 | Brant | 99/306 |
| 3,080,810 | A | * | 3/1963 | Saint | 99/306 |
| 3,334,574 | A | * | 8/1967 | Douglas | 210/474 |
| 3,800,954 | A | * | 4/1974 | Lampcov | 210/497.2 |
| 3,861,975 | A | * | 1/1975 | Hauslein | 210/474 |
| 3,927,703 | A | * | 12/1975 | Beaubien | 141/333 |
| 3,971,305 | A |   | 7/1976 | Daswick |   |
| 4,149,454 | A |   | 4/1979 | Kemp |   |
| 4,167,136 | A | * | 9/1979 | Chupurdy | 99/306 |
| 4,205,598 | A | * | 6/1980 | Leuschner et al. | 99/316 |
| 4,217,940 | A |   | 8/1980 | Wheeler |   |
| 4,221,670 | A | * | 9/1980 | Ziemek | 210/474 |
| 4,560,475 | A |   | 12/1985 | Kataoka |   |
| 4,697,503 | A |   | 10/1987 | Okabe et al. |   |
| 4,843,955 | A |   | 7/1989 | Henn et al. |   |
| 4,957,632 | A | * | 9/1990 | Bockstiegel et al. | 210/474 |
| 4,981,588 | A |   | 1/1991 | Poulallion |   |
| 4,986,172 | A |   | 1/1991 | Hunnicutt |   |
| 5,064,980 | A |   | 11/1991 | Grossman |   |
| 5,071,549 | A | * | 12/1991 | Hauslein | 210/474 |
| 5,095,185 | A |   | 3/1992 | Fuchs, Jr. |   |

(Continued)

OTHER PUBLICATIONS

Fisher Scientific LPE 10-349B, 10-500, 10-371, 2007, 1 p.

(Continued)

*Primary Examiner* — Stephen F Gerrity

(57) ABSTRACT

A conic funnel integrally connected to a supporting planar platform in combination with an essentially flat disposable filter that is transformed into a three-dimensional conic configuration disposed to be inserted into the conic funnel. The apex of the conic funnel is truncated and projected through a first circular orifice at the approximate center of the supporting planar platform such that an effluent is focused into a receiving vessel upon which the supporting planar platform is placed. A second orifice vents air displaced by the effluent. A tab-like member and/or handle are used to hold or hang the apparatus. The apparatus has special applications for brewing beverages such as coffee by using nonproprietary nonpreformed low-cost generic circular paper filters such as those used in consumer coffeemakers as well as eliminating auxiliary laboratory equipment needed to vertically hold Buchner type funnels.

7 Claims, 2 Drawing Sheets

U.S. PATENT DOCUMENTS

| | | |
|---|---|---|
| 5,243,164 A | 9/1993 | Erickson et al. |
| 5,503,740 A | 4/1996 | Callaghan et al. |
| 5,532,168 A * | 7/1996 | Marantz ........................ 210/474 |
| 5,605,710 A | 2/1997 | Pridonoff et al. |
| 5,664,480 A * | 9/1997 | DiFilippo ........................ 99/306 |
| 5,865,094 A * | 2/1999 | Kealy ............................. 99/306 |
| 6,402,103 B1 | 6/2002 | Hulett |
| 7,127,983 B2 | 10/2006 | Huda et al. |
| 2008/0053566 A1 * | 3/2008 | England ........................ 141/331 |
| 2009/0178572 A1 * | 7/2009 | Wolcott et al. .................. 99/323 |

OTHER PUBLICATIONS

Fisher Scientific Glass Fiber Circles, 2007, 1 p.
Fisher Scientific Gneral Filtration Member Filters, 2007, 1 p.
Fisher Scientific Fisherbrand Wet-Strengthened Qualitative Circles, 2007, 1 p.
Fisher Scientific P2 Grade Square Filters, 09-802, 2007, 1 p.
United States Plastic Corp. Nalgene Funnels, 2007, 1 p.

* cited by examiner

CONIC FUNNEL INTEGRALLY CONNECTED TO A SUPPORTING PLANAR PLATFORM

BACKGROUND OF THE INVENTION

1. Field of the Invention

This invention relates to a conic funnel integrally connected to a supporting planar platform in combination with a disposable filter means.

2. Description of the Prior Art

Truncated cones constituting funnels of various sizes and configurations have been known in their geometric configurations since classical antiquity to anyone familiar with the works of Euclid, see for example, The *Thirteen Books of the Elements*, Volume III, Book XI, Definition 24, pg. 262, Definition 18, pg. 270, Sir Thomas Heath, ed. Second Edition, revised, Dover Publications, Inc. New York, 1956.

Simple plastic funnels of a variety of sizes are readily available in the consumer market for household kitchen use as well as in do-it-yourself auto stores for directing motor oil into a valve cover of an engine or pouring gasoline into the filler tube.

Laboratory funnels of various configurations made of polyethylene, glass, or ceramics and of the Buchner type are well known in the chemical arts for filtering a variety of substances with various types of disposable porous filter means as well as filters integrated into the design of the funnel with orifices of various diameters to separate particulates from a mother liquid.

Circular filters such as those used in consumer coffeemakers are readily available as are basket type apparatuses that are removable from the parent coffeemaker for recharging the coffeemaker for subsequent brewing.

SUMMARY OF THE INVENTION

The fabrication of a conic funnel integrally connected to a supporting planar platform either standing alone or in combination with an essentially flat disposable filter means that can be transformed by origami-like manipulations into a three-dimensional conic configuration disposed to be inserted into a conic funnel is unique to the present invention.

Accordingly, an object of the present invention is to provide a conic funnel integrally connected to a supporting planar platform that is simple in design, structurally sound, inherently stable, and adaptable to a wide variety of applications.

Another object of the present invention is to provide a conic funnel integrally connected to a supporting planar platform that does not need supporting auxiliary apparatus such as brackets and other external structural means to keep the conic funnel in a stable upright vertical orientation over a receiving vessel so as to maintain continuous focused flow of an effluent.

Another object of the present invention is to transform inexpensive generic nonproprietary nonpreformed essentially flat filters into a three-dimensional conic configuration amenable to being inserted into a conic funnel for filtration processes such as for, but without necessary limitation, brewing a single or multiple cups of coffee in a simple, direct manner without the need for expensive coffee making or other like brewing machinery or apparatus.

BRIEF DESCRIPTION OF THE DRAWINGS

The manner in which the objects, features, and advantages of the present invention are attained will be apparent from the following description when considered in view of the drawings, wherein.

DETAILED DESCRIPTION OF THE PREFERRED EMBODIMENT

Figure 1:
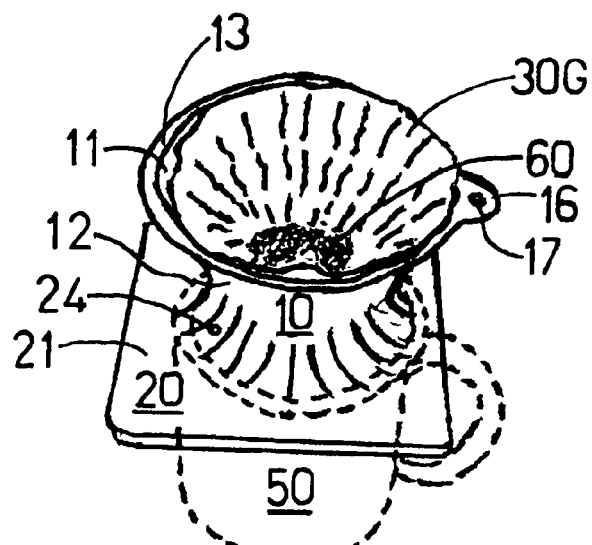
FIG. 1 is a perspective view of a conic funnel integrally connected to a square supporting planar platform. A nonproprietary nonpreformed generic circular essentially flat disposable filter has undergone a series of origami-like manipulations that transform the filter into a conic configuration that when opened and expanded conforms to the inside of the conic funnel. Particulate matter, such as for example but without necessary limitation, coffee grounds, have been placed into the bottom of the filter over which grounds hot water (not shown) is poured in a series of effusions to brew a cup of coffee. The supporting planar platform has been placed on top of a cup as a typical vessel to receive the effluent.

A conic funnel 10 having an inner surface 11, outer surface 12, and upper rim 13 is vertically positioned on a square supporting planar platform 20 having an upper surface 21, under surface 22, and first circular orifice 23 fabricated in the approximate center of the supporting planar platform 20 as shown FIGS. 1, 2, 3, 4, 5, and 6. The apex 14 of the conic funnel is truncated such that it has a circular cross-section 15. The diameter of the first circular orifice 23 is sufficiently large so as to permit the truncated apex 14 to be projected downwardly therethrough and below the under surface 22 of the supporting planar platform 20. The truncated apex 14 of the conic funnel is integrally connected to the supporting planar platform 20 at the juncture with the first circular orifice 23 of the supporting planar platform 20 so as to constitute an integral operatively one-piece conic funnel and supporting planar platform.

Figure 3:
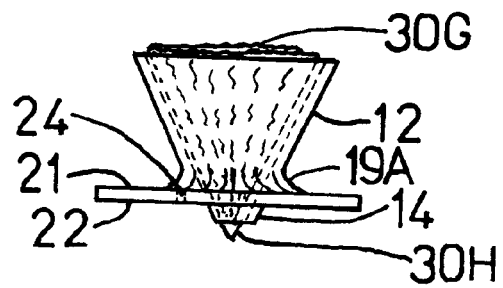
FIG. 3 is a side elevation view of the conic funnel integrally connected to the square supporting planar platform shown in FIG. 1 showing extrusions of additional material circumferentially around the juncture of the external surface of the conic funnel and upper surface of the supporting planar platform to further strengthen and stabilize the conic funnel perpendicularly to the supporting planar platform and the projection of the truncated apex of the conic funnel below the under surface of the supporting planar-platform so as to act as a stop against slippage of the supporting planar platform from the top of a receiving vessel and to protect the apex of the filter against rupture. An essentially flat circular disposable filter has undergone origami-like manipulations and has been expanded into a conic configuration and inserted into the conic funnel such that the apex of the conic filter is projected downwardly through the truncated apex of the conic funnel. A second circular orifice has been fabricated into the supporting planar platform to provide a means to vent the air from the receiving vessel displaced by the effluent.
Figure 4:
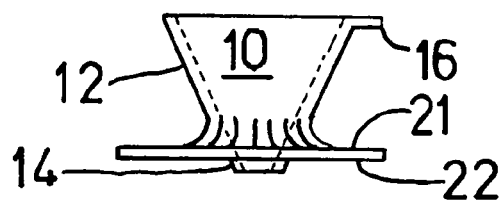
FIG. 4 is a side elevation view of the conic funnel integrally connected to the square supporting planar platform shown in FIG. 1 showing the tab-like member extended horizontally outwardly from the upper rim of the conic funnel and the truncated apex of the conic funnel projected downwardly through the supporting planar platform.
Figure 6:
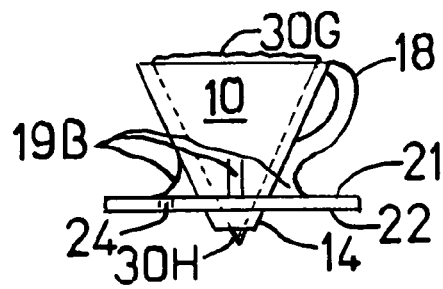
FIG. 6 shows another embodiment of the invention in which the extrusions of material circumferentially around the juncture of the conic funnel and upper surface of the supporting planar platform have been fabricated into rib-like members and a handle means has been fabricated outwardly and downwardly from the upper rim of the conic funnel to one of the rib-like members to further support and stabilize the conic funnel perpendicularly on the supporting planar platform.

The juncture between the outer surface 12 of the conic funnel and first circular orifice 23 in the upper surface 21 of the supporting planar platform 20 is further stabilized and supported by extrusions of material circumferentially around the first circular orifice 23. The extrusions may be as continuous material 19A as shown in FIGS. 1, 3, and 4 or as rib-like members 19B as shown in FIG. 6.

Figure 2:
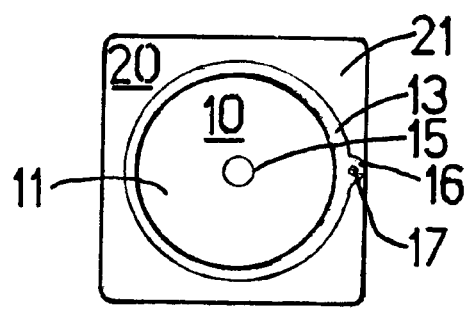
FIG. 2 is a top plan view of the conic funnel integrally connected to a square supporting planar shown in FIG. 1 at the approximate center of which square supporting planar platform has been fabricated a circular orifice through which the truncated apex of the conic funnel has been integrally connected, the upper rim of the conic funnel and tab-like member with orifice therethrough extended outwardly for holding the apparatus and for hanging the conic funnel in an essentially horizontal orientation.

The upper rim 13 of the conic funnel 10 is outwardly extended into a tab-like member 16 having an orifice 17 therethrough in the essential center as shown in FIGS. 1 and 2 disposed for holding and hanging the conic funnel 10 and supporting planar platform 20 in an essentially horizontal orientation. The upper rim 13 may also be extended outwardly and downwardly to the upper surface 21 of the supporting planar platform or to extrusions of material 19A or to rib-like members 19B into a handle means 18 to integrally connect the upper rim 13 to the supporting planar platform 20 to further stabilize and support the conic funnel 10 as shown in FIG. 6.

The truncated apex 14 of the conic funnel 10 is projected a sufficient distance below the under surface 22 of the supporting planar platform 20 so as to provide a means for stopping the supporting planar platform 20 from sliding off the surface of a receiving vessel 50, for example but without necessary limitation as shown in FIG. 1, a conventional coffee cup upon which the supporting planar platform 20 has been placed and to protect the projected apex of the disposable filter 30H from been ruptured that would therefore frustrate complete and effective filtration.

A second circular orifice 24 has been fabricated through the supporting planar platform at approximately one-half the distance between the center of the first circular orifice 23 and the downward projection of the upper rim 13 as a vent for air displaced by the effluent that flows into the receiving vessel.

Figure 8:
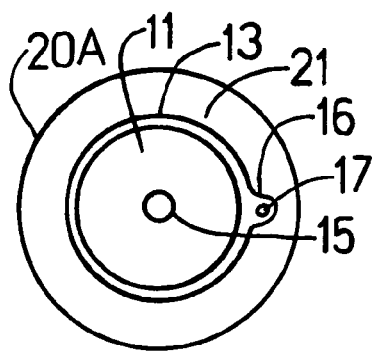
FIG. 8 is a top plan view of a conic funnel integrally connected to a circular supporting planar platform.

The supporting planar platform 20 is preferably square as the shape that provides the greatest accommodation between load bearing surface and economical use of material taking into consideration the anticipated weigh and volume of substance and liquid to be filtered and the size of the orifice of the receiving vessel over which the supporting planar platform is to be placed. FIG. 8 shows another embodiment of the invention with a circular supporting planar platform 20A.

Figure 7A:
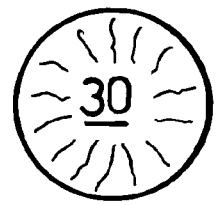
FIG. 7A is a top plan view of an essentially flat circular filter means.
Figure 5:
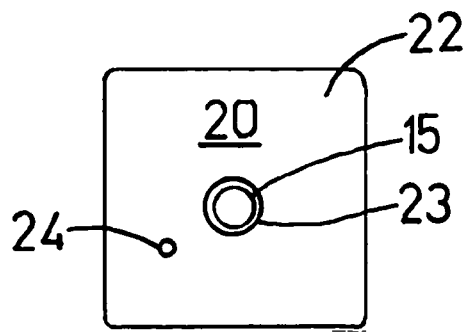
FIG. 5 is a bottom plan view of the conic funnel integrally connected to the square supporting planar platform shown in FIG. 1 showing the circular cross-section of the truncated apex and circular orifice in the supporting planar platform through which the truncated apex is projected downwardly therethrough and a second circular orifice that serves as a vent for air displaced by the effluent within the receiving vessel.
Figure 7B:
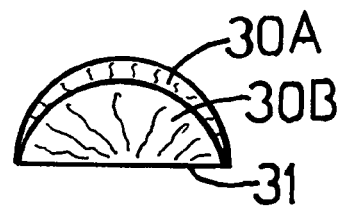
FIG. 7B is a perspective view of the essentially flat circular filter means of FIG. 7A that has been folded once across its diameter to form two essentially flat surfaces.
Figure 7C:
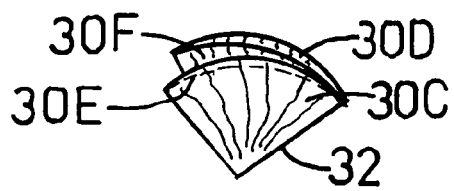
FIG. 7C is an perspective view of the two essentially flat surfaces of FIG. 7B that have been further folded once across a radius perpendicular to the diameter into four essentially flat surfaces constituting two outer surfaces and two inner surfaces which when one of the two outer surfaces is separated from the three remaining flat surfaces and when the configuration is opened and expanded the essentially flat circular filter is transformed into the three-dimensional conic configuration as shown in FIG. 1.

An essentially flat disposable filter means 30, such as but without necessary limitation, commercially available nonproprietary nonpreformed generic circular paper material, as shown in FIG. 7A, is once folded across its diameter 31 into two essentially flat surfaces 30A and 30B as shown in FIG. 7B. A second fold 32 is made across a radius perpendicular to the diameter to generate two essentially flat external surfaces 30C and 30D and two internal essentially flat surfaces 30E and 30F as shown in FIG. 7C. When one of the external surfaces is separated from the remaining three surfaces and opened and expanded the essentially flat filter 30 is transformed into a three-dimensional conic configuration 30G as shown in FIG. 1. The radius of the circular filter 30 should be equal to or greater than the length of the inner surface 11 of the conic funnel 10 when measured from upper rim 13 to the apex of the conic funnel 10 prior to its truncation so as to at a minimum fully-fit into and cover the inner surface 11 of the conic funnel 10 and to be projected downwardly through and below the truncated apex 14 into its own apex 30H as shown in FIGS. 1, 3, and 6.

Figure 7D:
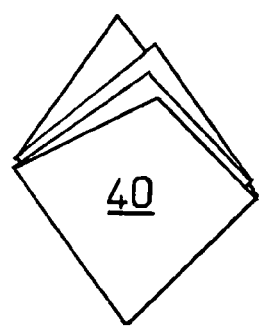
FIG. 7D is a perspective view of an essentially flat square filter that has undergone origami-like manipulations similar to those shown in FIG. 7C that transforms the filter into a three-dimensional-conic configuration disposed to be inserted into a conic funnel such as that shown in FIG. 1.

If the filter were essentially square 40, such as shown in FIG. 7D, then one-half of the side of the square should be equal to or greater than the length of the inner surface 11 of the conic funnel 10 as measured from the rim 13 to the apex of the conic funnel prior to truncation so as to as a minimum fully fit into and cover the inner surface 11 of the conic funnel 10. An essentially square filter 40 undergoes a similar series of folds as applied to a circular filter 30 except that the folds can be made either diagonally from corner to corner so as to result in four equally sized triangular essentially flat surfaces that when opened and expanded likewise form a three-dimensional conic configuration or if folded side to side result in four equally sized essentially flat squares such as shown in FIG. 7D that when opened again form a three-dimensional conic configuration.

When particulate material 60, as for example without necessary limitation, coffee grounds, is placed within the conic configuration 30G and a liquid, such as without necessary limitation hot water (not shown), is poured over the particulate material, the effluent containing the dissolved material is directed and focused downwardly into the apex 30H of the filter means and into a receiving vessel 50 as shown in FIG. 1.

The conic configuration 30G may be further shaped to adhere to the inner surface 11 of the conic funnel 10 by using the back concave surface of a spoon (not shown) so as to increase the surface tension and tight fit between the conic configuration 30G and the inner surface 11 of the conic funnel 10 when wetted.

After the coffee is brewed, the conic configuration 30G is further folded inwardly and overlappingly upon itself and the upper edge folded downwardly to enclose the spent coffee grounds into an essentially sealed pouch that can be pressed lightly with the concave side of a spoon to further squeeze out the effluent prior to removal and disposal of the filter 30.

As the conic funnel is stably vertically supported on the supporting planar platform without the need for any auxiliary bracketing or other equipment to maintain it in such an orientation the apparatus is adaptable to a variety of other applications where a conic funnel would be required to accomplish the simple task of filtration with the most economical use of materials.

An additional advantage of the planar platform configuration is its inherent stability on an essentially uniform horizontal surface as the truncated apex 14 of the conic funnel 10 is projected sufficiently below the under surface 22 of the supporting planar platform 20 and 20A such that the projection provides an additional means to prevent the supporting planar platform from slipping off the supporting surface as well as being able to accommodate a supporting surface that may have a slight grade insufficient to completely permit the total dislocation of the conic funnel integrally connected to a supporting planar platform from sliding off the supporting surface.

The cross-wise dimension of the supporting planar platform 20 and 20A is equal to or greater than the diameter of the upper rim 13 of the conic funnel and the outward extension of a tab-like member 16 or diameter of the upper rim 13 of the conic funnel 10 and furthest extension of a handle means 18 to be assured that the conic funnel 10 is stabily supported over a receiving vessel 50.

Other configurations and means of fabricating a conic funnel integrally connected to a supporting planar platform, such as for example without necessary limitation, a circular supporting planar platform or a conic funnel separately fabricated and then integrally connected to a supporting planar platform whose parts are then fused together by various means such as, but without necessary limitation, welding techniques for glass or ceramic components by various gas torch means, groove and outwardly projecting circular interlocking ring means that are pressure fitted together to form an integrated conic funnel and supporting planar platform, o-ring type configurations for joining separately fabricated parts, ultrasonic or microwave fusion techniques for plastic parts, all to accomplish the teaching of the invention as are well known to those skilled in the fabrication arts are within the contemplation of the within invention without departing from the scope herein.

I claim:

1. A conic funnel rigidly and fixedly integrally connected to a supporting planar platform in combination with a disposable filter means adapted to be reconfigured to a conic shape comprising:
    a conic funnel having an internal surface, external surface, upper rim, and truncated apex having a circular cross-section,
    a supporting planar platform having an upper surface and under surface perpendicularly oriented to the vertical axis of said conic funnel and a first circular orifice at the approximate center of said supporting planar platform at which orifice said truncated apex of said conic funnel is rigidly and fixedly integrally joined to said supporting planar platform and downwardly projected therethrough a sufficient distance below said under surface of said supporting planar platform to act as a means to prevent said supporting planar platform from slipping from the surface of a receiving vessel adapted to receive an effluent focused through said truncated apex of said conic funnel into the receiving vessel, said planar platform being adapted to a size to be supported by a supporting surface of a receiving vessel upon which said supporting planar platform has been placed and at which juncture between said first orifice in said supporting platform and external surface of said conic funnel additional extrusions of material have been placed to further support and stabilize said conic funnel to said supporting planar platform and a second circular orifice located at approximately one half the distance between the center of said first circular orifice and the downward projection of said rim of the said conic funnel disposed to vent the air displaced by an effluent delivered into a receiving vessel, and
    an essentially flat disposable filter means of such a size adapted to be formed by origami-like foldings into a conic configuration to conform, to said internal surface of said conic funnel and when opened to entirely cover said internal surface of said conic funnel and to be projected downwardly through said truncated apex of said conic funnel a suitable distance therebelow to focus an effluent into a receiving vessel and to be protected against rupture by said projecting truncated apex of said conic funnel.

2. The conic funnel rigidly and fixedly integrally connected to the supporting planar platform in claim 1 wherein the supporting planar platform is square.

3. The conic funnel rigidly and fixedly integrally connected to the supporting planar platform in claim 1 wherein the supporting planar platform is circular.

4. The conic funnel rigidly and fixedly integrally connected to the supporting planar platform of claim 1 wherein the essentially flat disposable filter means is circular.

5. The conic funnel rigidly and fixedly integrally connected to the supporting planar platform of claim 1 wherein the essentially flat disposable filter means is square.

6. A conic funnel fixedly-and-rigidly integrally connected to a square supporting planar platform in combination with an essentially flat disposable filter means adapted to be reconfigured into a conical-shape comprising:
    a conic funnel having an internal surface, external surface, upper rim that is extended outwardly and horizontally therefrom into a tab-like member having an orifice therethrough disposed for holding and hanging said conic funnel in an essentially horizontal orientation, and truncated apex having a circular cross-section,
    a square supporting planar platform having an upper surface and under surface, a first circular orifice fabricated at the approximate center of said square supporting planar platform of a dimension disposed to accept said truncated apex of said conic funnel which truncated apex is disposed to be projected downwardly therethrough a substantial distance below said under surface of said square supporting planar platform, said square supporting planar platform adapted to be sized to be supported on a receiving vessel adapted to have a surface upon which said square supporting planar platform is to be supported and an orifice adapted to receive an effluent from a conically shaped disposable filter means, a second circular orifice located at approximately one-half the distance between the center of said first circular orifice and the downward projection of the said upper rim of said conic funnel disposed to vent air displaced by an effluent delivered into a receiving vessel
    extrusions of material circumferentially located around the juncture of said external surface of said conic funnel and said upper surface of said square supporting planar platform disposed to further support and stabilize said conic funnel vertically and perpendicularly on said square supporting planar platform,
    a handle means extending outwardly from said upper rim of said conic funnel to said extrusions of material circumferentially located at said juncture of said external surface of said conic funnel and said upper surface at said first circular orifice to further support and stabilize said conic funnel, and an essentially flat circular filter means adapted to undergo origami-like manipulations to be transformed into a three-dimensional conic configuration disposed to be inserted into and when opened and expanded completely cover the said internal surface of said conic funnel whose apex is projected downwardly through said truncated apex of said conic funnel to focus an effluent into a receiving vessel and to be protected from rupture by said projected truncated apex of said conic funnel.

7. The conic funnel rigidly and fixedly integrally connected to the supporting planar platform of claim 6 wherein the said extrusions of material circumferentially around said junction of said conic funnel and said upper surface of said supporting planar platform is formed into rib-like members to which one of said rib-like members said handle means is attached.

* * * * *